3,490,501
MULTIPLE-USE ACCESSORY NOTABLY FOR HANDLING LIQUIDS
Jacques Manem, Suresnes, René Lefebvre, Paris, and René Jean Paul Bayet, Boulogne, France, assignors to Hans Stokman, Garches, Hauts-de-Seine, France
Filed June 26, 1967, Ser. No. 648,817
Claims priority, application France, June 28, 1966, 67,189
Int. Cl. B65b 1/04, 3/02, 39/00
U.S. Cl. 141—84            11 Claims

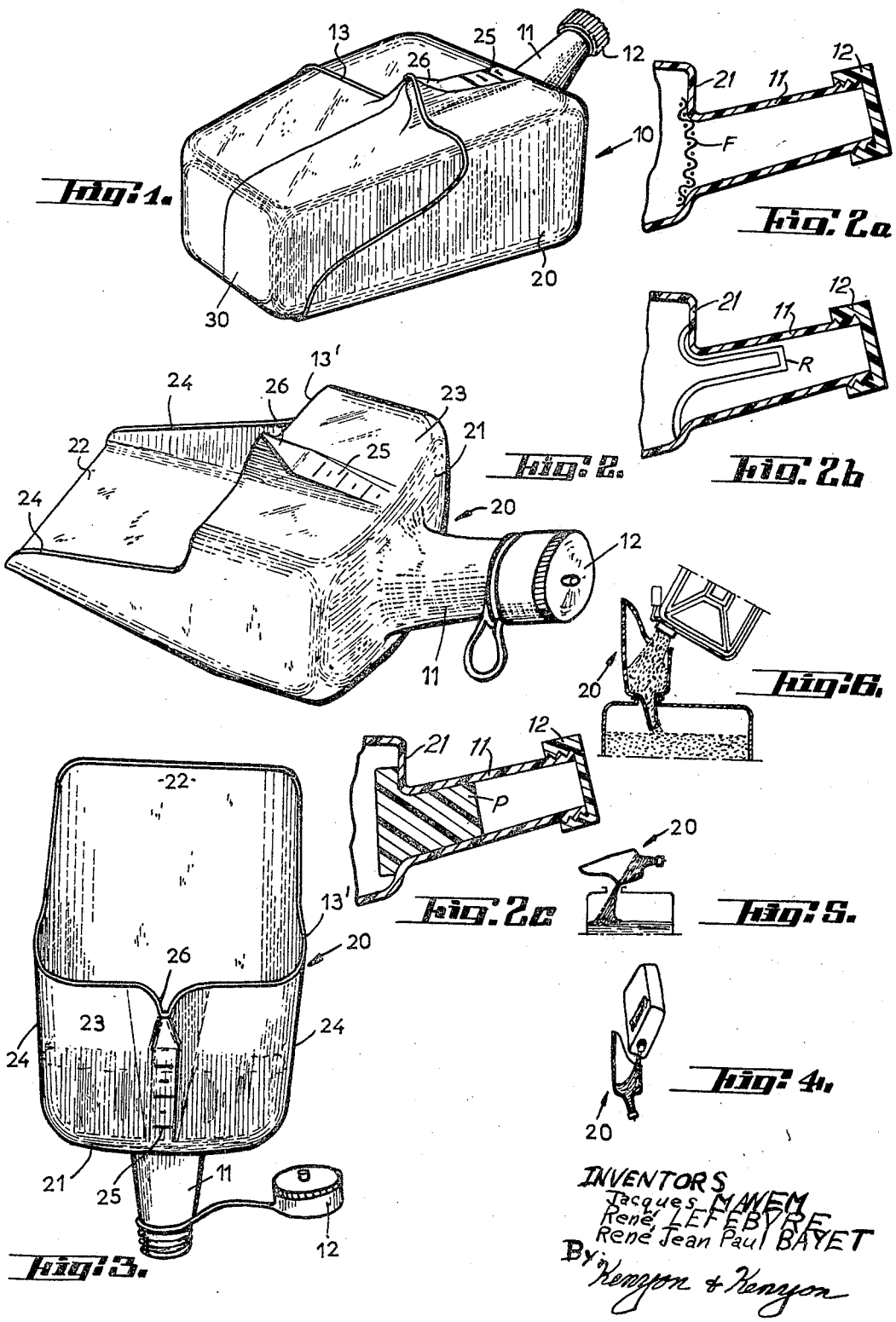
Jan. 20, 1970  J. MANEM ET AL  3,490,501
MULTIPLE-USE ACCESSORY NOTABLY FOR HANDLING LIQUIDS
Filed June 26, 1967
INVENTORS
Jacques MANEM
René LEFEBVRE
René Jean Paul BAYET
By Kenyon & Kenyon United States Patent Office
3,490,501
Patented Jan. 20, 1970

ABSTRACT OF THE DISCLOSURE

This invention relates to a multiple-use accessory, notably for handling liquids, and more particularly designed for fitting a pleasure boat, and notably a motor boat. Said accessory consists of a scoop provided with a tubular handle, shaped for use as a funnel, and comprising notably plug means for removably obturating said handle, and volumetric scale means for measuring its contents. Said accessory may consist in one part of a necked container made from plastic material and peripherally severed into at least two parts.

---

According to present regulations, the pleasure boats, and notably the motor boats, must be fitted with various obligatory accessories, and more particularly with a scoop, a funnel for pouring the spare fuel into the tank, and a gauge for mixing to the fuel the required amount of lubricant.

The present invention aims to the provision of a combined accessory capable of several different uses, in order to fulfil the official requirements without superfluous litter.

A multiple-use accessory according to this invention, more particularly designed for handling liquids, consists of a scoop provided with a tubular handle and shaped for use as a funnel.

Said accessory advantageously comprises plug means for removably obturating said tubular handle, and volumetric scale means for measuring its contents.

Said accessory could also be used as a filter and as a horn, suitable filtering means and reed means to be fitted in said tubular handle being provided to these respective ends.

According to a preferred embodiment of this invention, said accessory comprises a generally tubular body, one end of which is provided with a transverse end wall having a tubular extension providing a handle and the opposite end of which is shaped to form a substantially flat spatula, means for removably obturating said tubular extension, and volumetric scale means provided on said body for measuring its contents.

Other features and advantages of the multiple-use accessory according to this invention will appear more clearly from the following description of an illustrative embodiment shown on the accompanying drawings, on which:

FIGURE 1 is a perspective view of a plastic container;
FIGURES 2 and 3 show respectively in perspective and side views a multiple-use accessory cut out from the container of FIGURE 1;
FIGS. 2a, 2b and 2c are longitudinal sections of the handle with optional added parts thereon;
FIGURES 4 and 5 are diagrammatical sketches showing the accessory of FIGURES 2 and 3 being used for mixing lubricant to fuel; and
FIGURE 6 is a diagramamtic sketch showing said accessory being used as a funnel to pour spare fuel into a tank.

FIGURE 1 is a perspective view of a vessel 10 made from a flexible plastic material, such as polyethylene polyamide or the like, consisting of a generally parallelepipedic body provided with a neck 11 closed by means of a threaded plug 12; said vessel may be manufactured by any convenient process, such as blowing and then curing an inflatable bag within a hollow form, welding or gluing two premolded shells, etc. As shown, vessel 10 is provided with a peripheral bead 13 of peculiar configuration, intended to serve as a guide for cutting said vessel into two parts 20, 30, for a purpose to be explained hereinafter. In order to facilitate said cutting operation, a groove extending colinearly with said bead could be provided in the wall of the vessel, or a tearing thread could be embedded in said wall.

The part 20 thus severed from vessel 10 is shown separately in perspective and elevational views on FIGURES 2 and 3, respectively. Said part 20 constitutes a scoop having for a handle the neck 11 of vessel 10, and the spatula of which is delineated by an edge 13' resulting from the cutting of the vessel wall along guide bead 13.

Said scoop 20 essentially comprises a substantially tubular body of rectangular cross-section having one integral end wall 21 from which the handle 11 extends substantially normally, so that said end wall affords a guard to said handle. The broad faces 22, 23 of the scoop body are of unequal lengths the longer face 22 being encompassed by side rims 24 of increasing height cut out from the narrow faces of vessel 10.

Part 20 may be used as a scoop in a self-evident manner; however, it will be noted that its inherent flexibility permits the spatula of said scoop to follow the shape of intricated surfaces, such as those existing in the hull of a small boat.

Part 20 may also serve as a funnel, as shown on FIGURE 6; to this end, plug 12 is removed and handle 11 is then introduced into the tank or other vessel to be filled; it will be noted that end wall 21 affords a substantially flat abutment, thus enhancing stability, and that the longer broad face 22 of the funnel may be used as a windscreen, notably for preventing the introduction of moisture and dust into the vessel being filled; in this last regard, a removable filter F consisting of a perforated plug, wire mesh or the like could be provided within the neck 11, or at its inner mouth.

Part 20 may further be used as a volumetric gauge, by way of example for mixing lubricant with fuel. To this end, a measuring scale 25 is provided along its length, preferably on the shorter broad face 23 of the accessory, and the latter is advantageously made from a transparent, or at least translucent plastic material. Besides, the edge of said shorter face 23 is advantageously formed with a pouring nose 26. Thus and as shown on FIGURES 4 and 5, the accessory is conveniently filled with a predetermined amount of liquid, which is then easily poured into another vessel. When the accessory is to be used on a motor boat, the scale 25 may include graduations in terms of usual percentages of lubricant, indicating the corresponding amounts of lubricant to be admixed to a gallon, or to be poured into a standard jerrican.

Of course, the accessory 20 may prove useful for many other applications than those contemplated above. By way of example, it could serve as a shovel for freeing the wheels of an automotive vehicle from snow or mud, or for scattering sand on an icy road; it could also serve for measuring and handling pulverulent substances, such as detergents or household goods, for which the container 10 could afford a convenient selling package; owing to the provision of suitable reed or whistle R means to be fitted within its neck 11, the accessory could further serve as a horn; besides, a second plug P adapted to obturate the inner outlet of tubular handle 11 could be furnished in addition to the aforementioned plug 12, so that said handle may act as a float to prevent the accessory from sinking whenever it falls overboard.

At last, the second part 30 cut from vessel 10 is advantageously shaped to constitute a useful article, such as a soap-holder, a shovel, etc., or a holder for a like vessel 10; in this last regard, the closed end of vessel 10 is preferably made frusto-pyramidal.

What we claim is:

1. A vessel consisting of a generally parallelepipedic tubular body provided at one end with a bottom wall and at the opposite end with a tubular neck closed by a removable plug, characterized in that the wall of said body is formed with a peripheral linear structure adapted to facilitate severing of said vessel into a first part including said neck and a second part including said bottom wall, said structure extending substantially along the bottom edge of one face of said body, along parallel oblique lines across its adjacent faces, and across its opposite face substantially at the middle length thereof, whereby said first part severed from said vessel constitutes on the one hand a scoop having a tubular handle formed by said neck and a substantially flat spatula formed by said one face of said body, and on the other hand a funnel having a nose portion formed by said neck freed of said plug and a continuous skirt portion of unequal height formed by said faces of said body.

2. A vessel according to claim 1, characterized in that opposite end of said body is provided with a substantially flat, transverse end wall, from the center portion of which extends said tubular neck, whereby said end wall constitutes on the one hand a guard for said handle of said scoop and on the other hand a flat abutment for said funnel.

3. A vessel according to claim 1, characterized in that said opposite face of said body is provided with a measuring scale extending longitudinally thereof from said linear structure towards opposite end of said body, whereby said first part severed from said vessel having said neck closed by said plug further constitutes a measuring gauge.

4. A vessel according to claim 3, characterized in that said opposite face of said body is locally deformed adjacent to said linear structure and measuring scale, whereby the edge of said first part severed from said vessel constituting said measuring gauge is provided with a pouring nose.

5. A vessel according to claim 1, characterized in that said linear structure consists of a bead provided on the external surface of said body to serve as a guide for severing said vessel into said first and second parts.

6. A vessel according to claim 1, characterized in that said linear structure consists of a groove provided in the external surface of said body to enable tearing of said vessel into said first and second parts.

7. A vessel according to claim 1, characterized in that said linear structure comprises a tearing thread embedded in the wall of said body, made integrally of plastic material.

8. A vessel according to claim 1, characterized by a removable plug member adapted to close the mouth of said tubular neck in said body, whereby said handle of said scoop constitutes a float.

9. A vessel according to claim 1, characterized by a removable filter member adapted to fit in the mouth of said tubular neck of said body for filtering the substance poured by means of said funnel.

10. A vessel according to claim 1, characterized by a removable reed member adapted to fit in the outer end of said tubular neck, whereby said first part severed from said vessel further constitutes a horn.

11. A multiple use accessory particularly for handling liquids comprising a generally tubular body of plastic material, one end of said body having a transverse end wall, a tubular extension integral with said end wall serving as a liquid conduit and as a handle for the accessory, the other end of said body being shaped to form a substantially flat spatula, said body having side walls whose forward ends taper toward the body's bottom to delineate said spatula shape, said body also having an integral cover part extending forwardly from said end wall which is shorter in length than and spaced from said bottom, said cover having a pouring nose formed therein and volumetric scale markings in its surface, a removable closure for the outer end of said tubular extension, said cover being attached to said extension to prevent its loss.

References Cited

UNITED STATES PATENTS

| | | | |
|---|---|---|---|
| 259,782 | 6/1882 | Toppel | 116—139 |
| 447,888 | 3/1891 | Masbach | 141—98 |
| 884,489 | 4/1908 | Hanson | 141—98 |
| 952,313 | 3/1910 | Droz | 141—98 |
| 1,039,574 | 9/1912 | Morrill | 141—98 |
| 1,196,784 | 9/1916 | Jasper | 141—84 |
| 2,107,981 | 2/1938 | Ford | 116—2 |
| 2,254,936 | 9/1941 | Dick. | |
| 2,933,110 | 4/1960 | Sharp | 141—98 |

HOUSTON S. BELL, Jr., Primary Examiner

U.S. Cl. X.R.

141—94, 98, 331; 150—.5; 215—1; 220—85; 222—192, 462

PO-1050
(5/69)

UNITED STATES PATENT OFFICE
CERTIFICATE OF CORRECTION

Patent No. 3,490,501          Dated  January 20, 1970

Inventor(s) Jacques Manem, René Lefebyre and René Jean Paul Bayet

It is certified that error appears in the above-identified patent and that said Letters Patent are hereby corrected as shown below:

Column 1, line 8, after 67,189 insert:

---and 94,186 application France February 8, 1967---

SIGNED AND
SEALED
SEP 29 1970

(SEAL)
Attest:

Edward M. Fletcher, Jr.
Attesting Officer

WILLIAM E. SCHUYLER, JR.
Commissioner of Patents